United States Patent
Cole (10) Patent No.: US 9,247,319 B2
(45) Date of Patent: Jan. 26, 2016

(54) PANEL ASSEMBLY

(71) Applicant: CISCO TECHNOLOGY, INC., San Jose, CA (US)

(72) Inventor: George Glen Daniel Cole, Austin, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 158 days.

(21) Appl. No.: 13/919,777

(22) Filed: Jun. 17, 2013

(65) Prior Publication Data

US 2014/0370226 A1  Dec. 18, 2014

(51) Int. Cl.
| | |
|---|---|
| *H01R 13/60* | (2006.01) |
| *H01R 13/518* | (2006.01) |
| *H04Q 1/02* | (2006.01) |
| *H04Q 1/04* | (2006.01) |
| *H04Q 1/14* | (2006.01) |

(52) U.S. Cl.
CPC ............. *H04Q 1/13* (2013.01); *Y10T 29/49826* (2015.01); *Y10T 428/17* (2015.01)

(58) Field of Classification Search
CPC ...................................................... H04Q 1/13
See application file for complete search history.

(56) References Cited

U.S. PATENT DOCUMENTS

| | | | | | |
|---|---|---|---|---|---|
| 4,131,330 | A * | 12/1978 | Stupay | ...................... | H05K 7/00 439/49 |
| 4,595,799 | A * | 6/1986 | Krob | ..................... | H05K 1/0295 361/760 |
| 4,712,232 | A * | 12/1987 | Rodgers | ................... | H04Q 1/14 174/60 |
| 4,747,020 | A * | 5/1988 | Brickley | .................. | H04Q 1/14 361/827 |
| 5,011,257 | A * | 4/1991 | Wettengel et al. | .............. | 385/53 |
| 5,599,191 | A * | 2/1997 | DeLara | ..................... | H04Q 1/13 439/49 |
| D402,639 | S * | 12/1998 | Baxter | ......................... | D13/184 |
| 5,902,961 | A * | 5/1999 | Viklund | .................... | H02G 3/26 174/100 |
| 5,918,837 | A * | 7/1999 | Vicain | ................... | F16L 3/1226 174/135 |
| 5,969,294 | A * | 10/1999 | Eberle | .................. | G02B 6/3825 174/57 |
| 6,167,183 | A * | 12/2000 | Swain | .................. | G02B 6/4454 385/134 |
| 6,208,796 | B1 * | 3/2001 | Williams Vigliaturo | ............ | G02B 6/4453 324/66 |
| 6,424,781 | B1 * | 7/2002 | Puetz | ................... | G02B 6/4452 385/135 |
| 6,497,578 | B1 * | 12/2002 | Kwong | .................. | H05K 1/147 439/61 |

(Continued)

FOREIGN PATENT DOCUMENTS

| | | | | | |
|---|---|---|---|---|---|
| CA | 2533486 A1 | * | 7/2007 | ............... | H04Q 1/06 |
| CN | 201499269 U | * | 6/2010 | | |

(Continued)

OTHER PUBLICATIONS

Cisco Systems, Inc., "*Catalyst* Inline Power Patch Panel," Data Sheet, © 2000, 5 pages.

(Continued)

*Primary Examiner* — Jeff Vonch
(74) *Attorney, Agent, or Firm* — Patent Capital Group (57) ABSTRACT

In one example embodiment, a panel assembly is provided that includes a first panel element having a first side edge to be attached to a communications rack, where the first panel element includes a first plurality of apertures proximate to the first side edge. The panel assembly also includes a second panel element having a second side edge to be attached to the communications rack, where the second panel element includes a second plurality of apertures proximate to the second side edge. The panel assembly also includes a third patch panel element provided between the first panel element and the second panel element.

16 Claims, 6 Drawing Sheets

(56) References Cited

U.S. PATENT DOCUMENTS

| | | | | |
|---|---|---|---|---|
| 6,513,770 B1* | 2/2003 | Franz | | G02B 6/4471 248/200 |
| 6,761,585 B2* | 7/2004 | Clark | | H01R 13/518 439/540.1 |
| 6,901,200 B2* | 5/2005 | Schray | | G02B 6/4453 385/135 |
| 6,918,786 B2* | 7/2005 | Barker | | G02B 6/4452 439/540.1 |
| 7,005,996 B2* | 2/2006 | Cabrera | | H05K 7/1457 174/50 |
| 7,179,119 B2* | 2/2007 | Follingstad | | H01R 13/518 439/534 |
| 7,207,835 B2* | 4/2007 | Levesque | | H04Q 1/066 439/540.1 |
| 7,220,145 B2* | 5/2007 | Denovich | | G02B 6/4452 439/540.1 |
| 7,300,308 B2* | 11/2007 | Laursen | | G02B 6/3897 439/540.1 |
| 7,335,056 B1* | 2/2008 | Clark | | H01R 13/518 439/534 |
| 7,393,243 B2* | 7/2008 | Caveney | | H01R 25/16 439/540.1 |
| 7,488,205 B2* | 2/2009 | Spisany | | H04Q 1/13 385/135 |
| 7,591,676 B2* | 9/2009 | Martich | | H01R 13/74 439/540.1 |
| 7,637,773 B2* | 12/2009 | Shifris | | H01R 9/2416 439/540.1 |
| 7,874,869 B2* | 1/2011 | Chern | | H01R 13/518 439/540.1 |
| 7,875,799 B2* | 1/2011 | Fransen et al. | | 174/66 |
| 7,910,820 B2* | 3/2011 | Kobayashi | | G10L 25/78 700/94 |
| 7,963,797 B2* | 6/2011 | Knappe | | A61G 13/107 439/534 |
| 7,978,951 B2* | 7/2011 | Krampotich | | G02B 6/4452 385/135 |
| 8,246,382 B1* | 8/2012 | Ku | | H04Q 1/131 439/540.1 |
| 8,585,437 B2* | 11/2013 | Lin | | H01R 13/518 439/532 |
| 8,834,199 B2* | 9/2014 | Foung | | H01R 13/518 439/540.1 |
| 8,861,918 B2* | 10/2014 | Vazquez | | G02B 6/4455 385/135 |
| 2002/0181896 A1* | 12/2002 | McClellan | | H05K 7/1448 385/88 |
| 2003/0022552 A1* | 1/2003 | Barker | | G02B 6/4452 439/540.1 |
| 2003/0185535 A1* | 10/2003 | Tinucci | | G02B 6/4455 385/134 |
| 2007/0190815 A1* | 8/2007 | Sampson | | H04Q 1/06 439/49 |
| 2009/0163043 A1* | 6/2009 | Demers | | G02B 6/4452 439/43 |
| 2009/0179116 A1* | 7/2009 | St-Louis | | G02B 6/4452 248/68.1 |
| 2009/0305554 A1* | 12/2009 | Siano | | G02B 6/4452 439/540.1 |
| 2010/0068923 A1* | 3/2010 | Tabet | | H01R 13/518 439/540.1 |
| 2012/0051708 A1* | 3/2012 | Badar et al. | | 385/135 |

FOREIGN PATENT DOCUMENTS

| | | | | |
|---|---|---|---|---|
| EP | 943944 A1 * | 9/1990 | | |
| GB | 2470184 A * | 11/2010 | | H04Q 1/06 |
| WO | WO 0028363 A1 * | 5/2000 | | G02B 6/3897 |
| WO | WO 2013050703 A1 * | 4/2013 | | H05K 7/1448 |

OTHER PUBLICATIONS

Cisco Systems, Inc., "Catalyst 6500 Series 96-Port Splitter Patch Panel Installation Note," © 2004, 20 pages.

* cited by examiner

PANEL ASSEMBLY

TECHNICAL FIELD

The present disclosure relates to a mechanical design for communication systems and, more particularly, to a panel assembly.

BACKGROUND

Patch panels are used in the field of data communication systems to provide a plurality of network ports that can be incorporated into a single structural element. Such a structural element can connect incoming and outgoing lines of any suitable network (e.g., a local area network (LAN)), or connect other communication, electronic, and electrical systems. Patch panels are often mounted in hardware units that can include a plurality of port locations (e.g., twenty-four, forty-eight, etc.) and can function as a sort of static switchboard (e.g., using cables to interconnect computers associated with a LAN and/or to connect computers to an outside network). This could involve a connection to the Internet or to a wide area network (WAN).

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one example embodiment, a panel assembly is provided that includes a first panel element having a first side edge to be attached to a communications rack, where the first panel element includes a first plurality of apertures proximate to the first side edge. The panel assembly also includes a second panel element having a second side edge to be attached to the communications rack, where the second panel element includes a second plurality of apertures proximate to the second side edge. The panel assembly also includes a third patch panel element provided between the first panel element and the second panel element.

In more specific embodiments, the first panel element, the second panel element, and the third panel element form a single elongated element (e.g., unitary, integral, etc.). The can form first panel element forms a plurality of steps (inclusive of any suitable undulations) relative to a top surface of the panel assembly. The first plurality of apertures can be distributed on the plurality of steps. The first and second pluralities of apertures are to receive one or more electrical components (which includes any suitable electronic objects, devices, elements, etc.).

In yet other embodiments, the panel assembly can include a plurality of flange members proximate to the first panel element, where the plurality of flange members is configured to be used in securing the panel assembly to the communications rack. In certain cases, the third panel element is at least 50% of a width of the panel assembly. In yet other embodiments, the first panel element forms a curvature relative to a top surface of the panel assembly. In addition, the first panel element can alternatively form a diagonal relative to a top surface of the panel assembly. In other cases, the panel assembly can include at least one flange member that is to define a mounting face for mounting the panel assembly to the communications rack.

The panel assembly can include a perimeter that is reinforced and that is integral to at least one of the patch panels. In more specific embodiments, the panel assembly can include a top panel and a bottom panel, where the top panel and the bottom panel define a region that is to provide an air dam to increase airflow to at least one instrument (inclusive of any suitable electronic equipment, devices, components, etc.) mounted in the communications rack.

In the context of one example methodology, a method for forming a panel assembly is provided and can include forming (e.g., manufacturing, producing, generating, etc.) a first panel element having a first side edge to be attached to a communications rack, where the first panel element includes a first plurality of apertures proximate to the first side edge; forming a second panel element having a second side edge to be attached to the communications rack, where the second panel element includes a second plurality of apertures proximate to the second side edge; and forming a third patch panel element provided between the first panel element and the second panel element.

Example Embodiments

Figure 1:
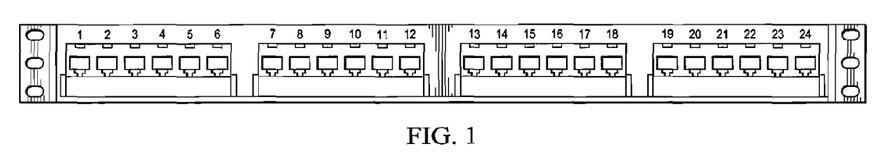
FIG. 1 illustrates an example of an angled patch panel assembly.

Turning to FIG. 1, FIG. 1 is a simplified block diagram of an example patch panel for any suitable communication system. In certain cases, a jumper cable, for example a patch cord, can be used to create each interconnection for ports of the patch element. Note that typical patch cords use coaxial cable. Coaxial cable can conduct electrical signals using an inner conductor (e.g., a solid copper, a stranded copper or copper plated steel wire, etc.) that may be surrounded by an insulating layer. Such cables may be enclosed by a shield, typically one to four layers of woven metallic braid and metallic tape. The cable is often protected by an outer insulating jacket.

Despite competition from other materials, copper is commonly used as an electrical conductor for electrical wiring. Many electrical devices rely on copper wiring because of its multitude of inherent beneficial properties, such as its high electrical conductivity, tensile strength, ductility, creep (deformation) resistance, corrosion resistance, low-thermal expansion, high-thermal conductivity, solderability, ease of installation, etc. The ever-increasing demand for copper and other precious metals places a severe strain on the global metal supply chain. When the cost of copper rises, this also increases the costs of the coaxial cables, which results in higher costs in related equipment.

Figure 2:
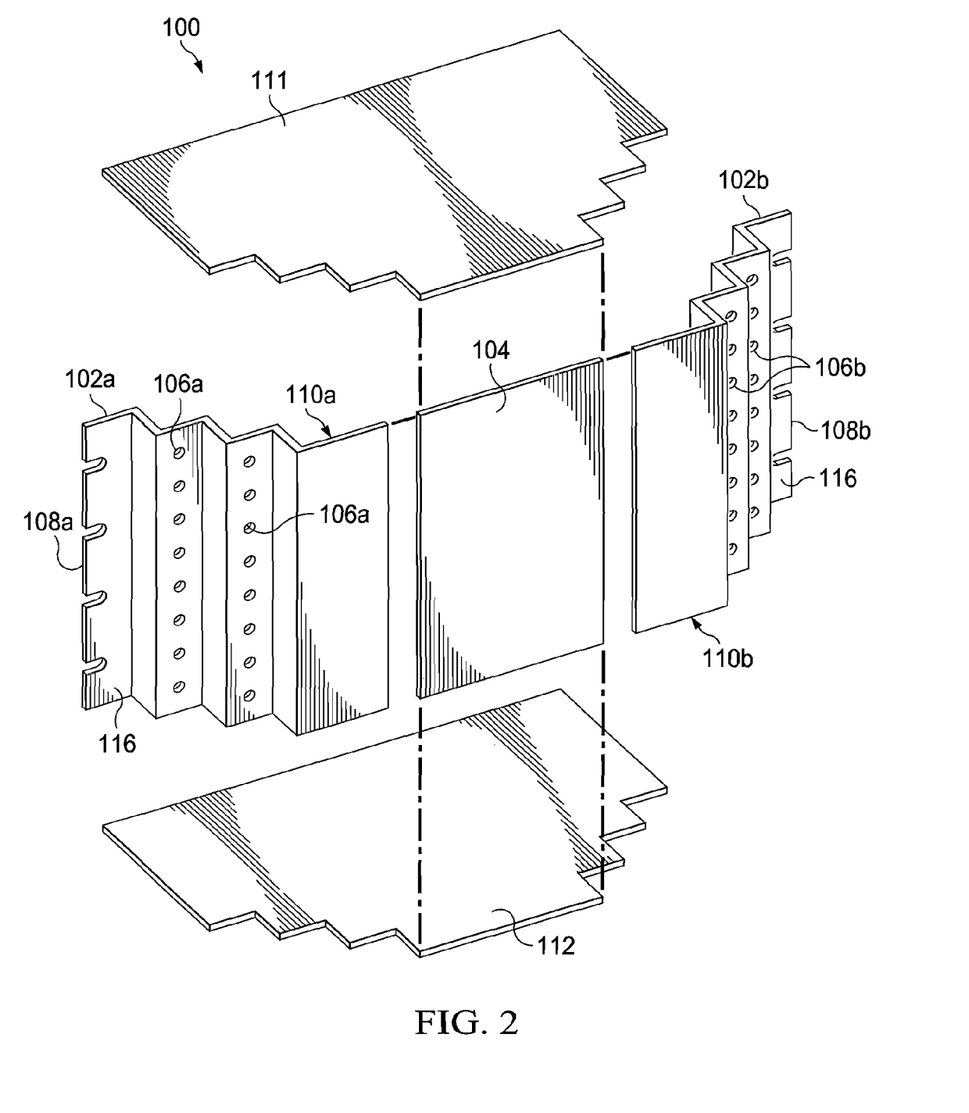
FIG. 2 illustrates an exploded view of an embodiment of an angled patch panel assembly according to one embodiment of the present disclosure.

FIG. 2 illustrates an exploded view of an example embodiment associated with an angled patch panel assembly 100 in accordance with the teachings of the present disclosure. Angled patch panel assembly 100 can be configured for mounting to a communications rack (or to any other suitable object, element, apparatus, etc.) such that angled patch panel assembly 100 is horizontally positioned between a first and a second rack support. Angled patch panel assembly 100 includes a first and a second patch panel element 102a, 102b, where each patch element 102a, 102b has a respective side edge for attaching to the corresponding rack support. A third patch panel element 104 can be provided between first and second patch panel elements 102a, 120b. For first and second patch panel elements 102a, 102b, a plurality of apertures 106a, 106b are distributed proximate a respective side edge 108a, 108b, where side edges 108a, 108b can oppose a third patch panel element 104. A top panel element 111 can suitably couple to the top edge of the first, second, and third panel elements. A bottom panel element 112 can couple to a bottom edge of the first, second, and third panel elements 102a, 102b, 104.

In one example embodiment, angled patch panel assembly 100 can be configured for mounting to a rack or a console. In addition, angled patch panel assembly 100 can facilitate cable management functions and minimize cabling used at (and around) the rack/patch panel assembly. In a certain embodiment, angled patch panel assembly 100 can include first and second patch panel elements that are angularly oriented with respect to each other. The transition from the first patch panel element to the second patch panel element could be achieved in an apex region, such that the apex region forms an acute angle. The first and second patch panel elements generally include a front face that is integrally formed, although it is contemplated that distinct patch panel elements may be used in fabricating the front face of the angled patch panel assembly of the present disclosure. Such distinct patch panel elements can be joined in the apex region through an appropriate structural connection.

In at least one embodiment, the perimeter of the angled patch panel assembly is reinforced. The reinforcement may be integral to the angled patch panel assembly such as a rolled or folded edge or added such as an additional support. The angled patch panel assembly typically includes a plurality of modular jacks or ports in the front face that are adapted to receive plugs and associated punch down blocks at the rear of the angled patch panel assembly. The number of ports associated with the disclosed angled patch panel assembly may vary in accordance with particular designs. The ports are positioned along the perimeter of the angle patch panel. In operation, the angled patch panel assembly of the present disclosure facilitates cable routing to the sides of the rack/console.

The angled patch panel assembly of the present disclosure may be dimensioned to function in cooperation with existing rack/console structures (e.g., 19" racks, 23" racks, etc.). A plurality of the disclosed angled patch panel assembly may be mounted with respect to a single rack/console, or mounted in any other suitable fashion, which may be based on particular needs or environments.

In at least one example, first and second patch panel elements 102a, 102b include steps 110a, 110b. A plurality of apertures 106a, 106b can be distributed on the step surfaces, which can be parallel to third patch panel element 104. While in this illustrative embodiment, first and second patch panel elements 102a, 102b have the same number of steps and are positioned at the same angle relative to the third panel element, the first and second panel elements 102a, 102b may differ in the number of steps, tread depth, height, width, etc. The steps can be parallel to the vertical rails of the rack (or parallel or skewed with respect to any other suitable object, element, apparatus, etc.), or provided in any other suitable fashion. In this embodiment, the first step includes mounting holes for attaching to the rack. The first step may have a different depth to accommodate both mounting holes for attaching to the rack and apertures, as is described below.

In at least one embodiment, three pitch lines of the first and second patch panel elements 102a, 102b intersect at an acute angle of approximately 45 degrees or less. Each of first and second plurality of apertures 106a, 106b can be configured and dimensioned to receive one of a plurality of jack modules (or to receive any other suitable object, element, apparatus, etc.). Each jack module can be retained in position with respect to the first or second patch panel by at least one mounting bracket. While in this illustrative embodiment, each step has the same number of apertures that are linearly placed, the apertures may be unevenly distributed. The jacks associated with the jack modules of the present disclosure may be of any suitable electronic design with appropriate levels of performance (e.g., CAT 5E performance, CAT 6 performance levels, etc.).

Third patch panel element 104 is at least 50% of the width of the patch panel in accordance with certain example embodiments. In combination with top panel element 111 and bottom panel element 112, this region can provide an air dam that can increase the airflow to instruments mounted in the rack. While this embodiment shows the third patch panel topography as planar, it may also be convex, concave, periodic, aperiodic, or provisioned in any other suitable manner.

In an alternative embodiment, the first, second, and third patch panel elements 102a, 102b, 104 may be formed from a material that is sufficiently rigid (e.g., an elongated steel member). They may be individually formed and connected, formed from a single elongated steel member, or designed in any other shape.

In at least one embodiment, a three-dimensional patch panel, whose geometry reduces the length of infrastructure cabling required by an average of 4.5" per-port can be employed. By making the patch panel three-dimensional, instead of flat, and by clustering the copper or fiber ports within 4" of the edge of the patch panel, the length of infrastructure cabling required can be reduced by an average of 4.5" per-port in certain embodiments of the present disclosure.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such.

In certain cases, the architecture of the present disclosure can operate as an effective air dam, due to the lack of holes, which augments its thermal management properties by reducing escaping airflow. In one example, the copper and fiber ports are provisioned four (4) across, on each step of the panel. In other examples, more or less copper and/or fiber ports are provisioned at this location. Patch panels can be connected to devices (or other patch panels) via infrastructure cabling (copper or fiber cable).

In at least one embodiment, the patch panel design described herein effectively reduces the length of infrastructure cabling required. For example, the length of infrastructure cabling required can be reduced by an average of 4.5" per-port in certain embodiments of the present disclosure. This could be achieved by constructing the patch panel three-dimensionally, potentially in conjunction with using the 4" of unused space between the cabinets' vertical rails and the exterior of the cabinet. In accordance with certain embodiments of the present disclosure, at least four shapes can be implemented to achieve these results (e.g., stepped, ramped, angled, arched). In certain embodiments, one fiber patch panel is provided per cabinet, and 16 fiber ports can be provided per panel, per cabinet.

Figure 3:
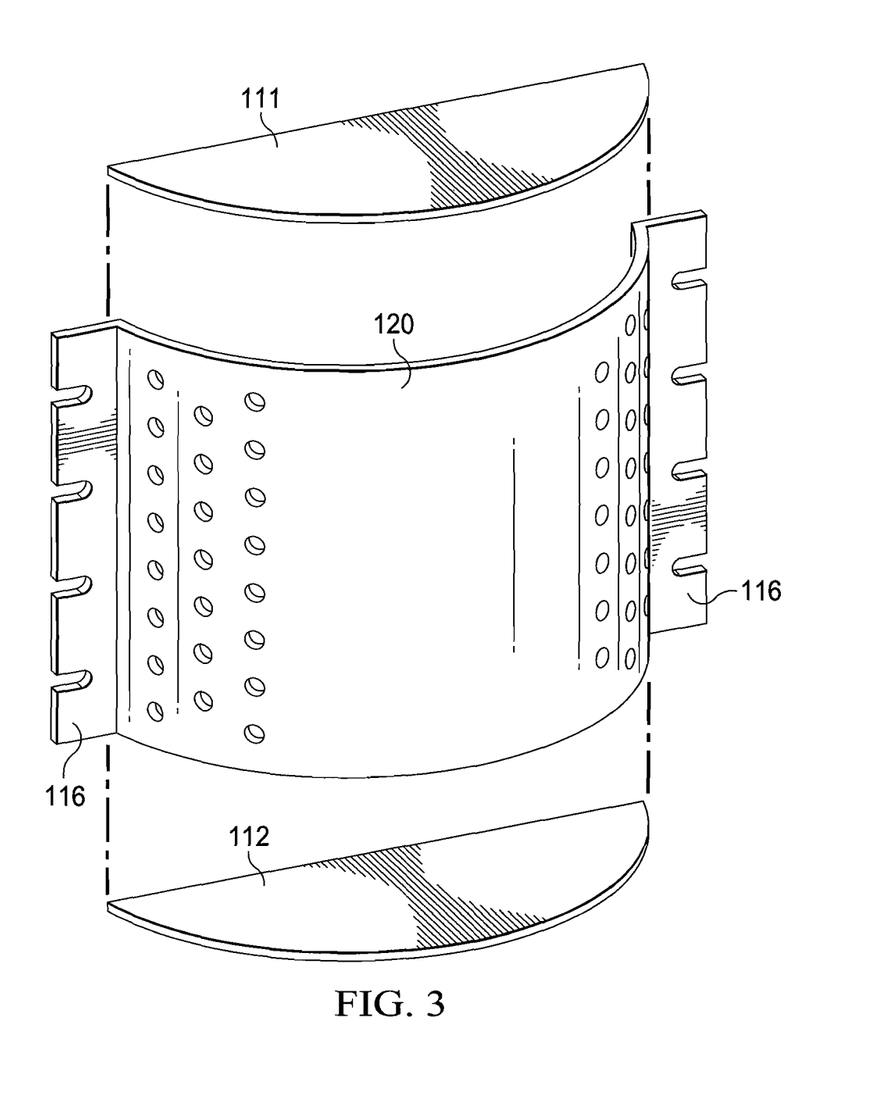
FIG. 3 illustrates an exploded view of another embodiment of the angled patch panel assembly according to one embodiment of the present disclosure.

FIG. 3 illustrates an exploded view of an example embodiment having a curved elongated member 120, which can form first and second patch panel elements 102a, 102b. In at least one embodiment, there is a bend in the apex region that differentiates the first patch panel element from the second patch panel element. The bend angle can be selected based on the desired geometry of the angled patch panel assembly. Elongated member 120 can further include a "rearward" bend at the base thereof, where such a rearward bend defines an elongated shelf that extends substantially from side-to-side, relative to first and second patch panel elements. The apex region can provide an air dam to increase the airflow to the instruments in the rack. A top panel element 111 can suitably couple to the top edge of the first and second panel elements. A bottom panel element 112 can suitably couple to the bottom edge of first and second panel elements 102a, 102b. Similar to third patch panel element 104 in FIG. 2, the apex region can be at least 50% of the width of the patch panel. Note that while in this illustrative embodiment, first and second patch panel elements 102a, 102b have a similar curvature, first and second panel elements 102a, 102b may differ in curvature. In at least one embodiment, the apertures are positioned outside of the apex region.

Figure 4:
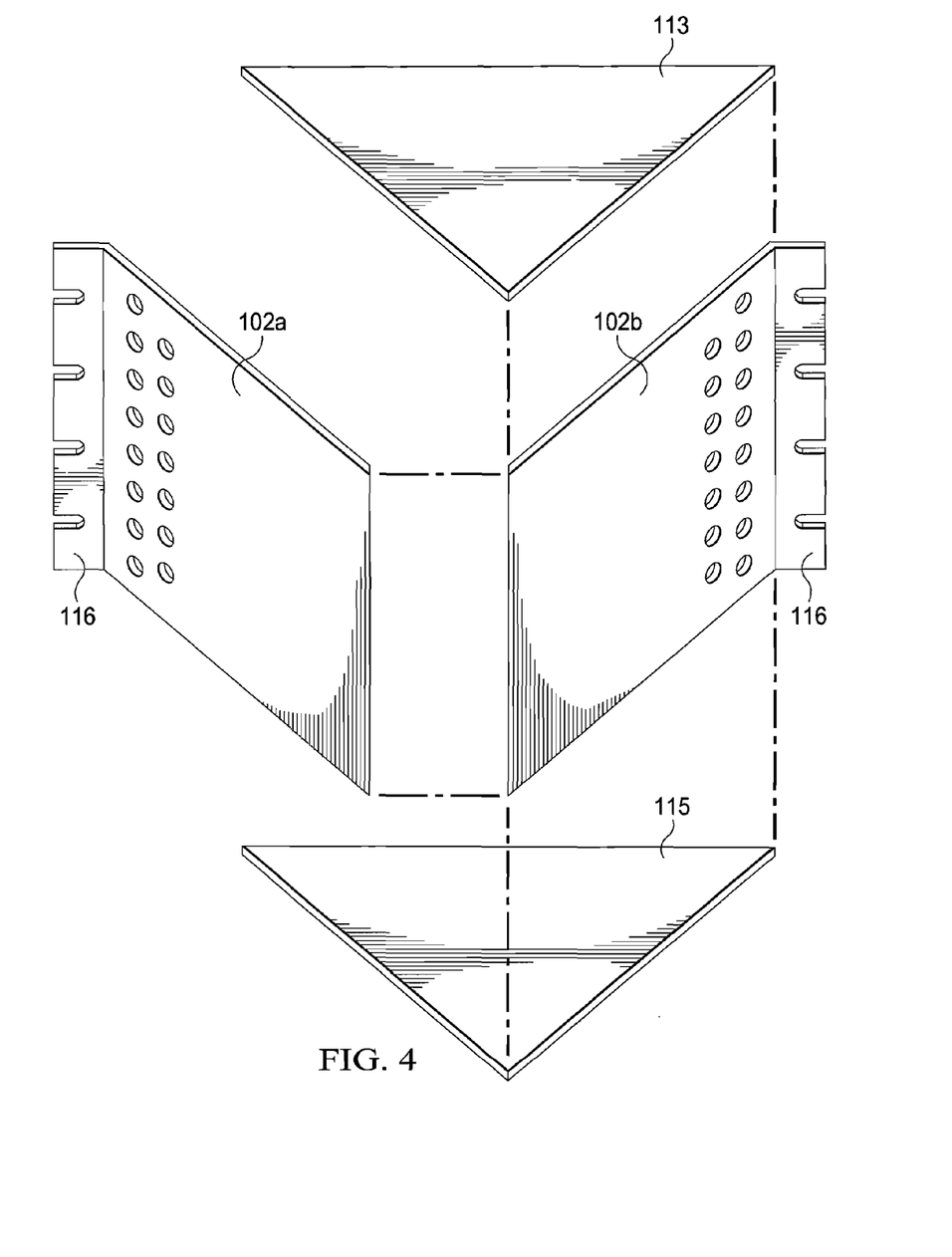
FIG. 4 illustrates an exploded view of another embodiment of the angled patch panel assembly according to one embodiment of the present disclosure.

FIG. 4 illustrates an exploded view of an example embodiment in which first and second panel elements 102a, 102b are relatively flat. First patch panel element 102a and second patch panel element 102b are angularly oriented with respect to each other. The transition from first patch panel element 102a to second patch panel element 102b occurs in an apex region. This transition can be an acute angle in certain embodiments of the present disclosure. The apex region is generally defined at (or near) the midpoint of angled patch panel assembly. The apex region can provide the air dam to increase the airflow to the instruments in the rack. A top panel element 113 can couple to the top edge of the first and second, panel elements. A bottom panel element 115 can couple to the bottom edge of the first and second panel elements. Similar to the third patch panel element in FIG. 2, the apex region can be at least 50% of the width of the patch panel in certain embodiments of the present disclosure. Similar to FIG. 3, the apertures can be positioned outside of the apex region in certain embodiments of the present disclosure.

With further reference to FIGS. 2-4, the angled patch panel assembly includes one or more flange members 116 that can extend from first patch panel element 102a and second patch panel element 102b, respectively. Flange members 116 are formed and/or positioned at each end of the angled patch panel assembly. Each of the flange members can define a mounting face that includes mounting features for facilitating mounting of the angled patch panel assembly relative to a communications rack (where this term 'communications rack' can include any suitable rack, housing, console, electronic equipment, cabinet, framework, latticework, structure, etc.). Such mounting features typically take the form of apertures (where the term 'aperture' includes any suitable slots, holes, openings, etc.), although any alternative mounting features may be employed. In at least one embodiment, the angled patch panel assembly can include flange members that extend from the first and second patch panel elements. Each of the flange members can define a mounting face and an extension arm that is intermediate to the mounting face and the patch panel element.

Figure 5:
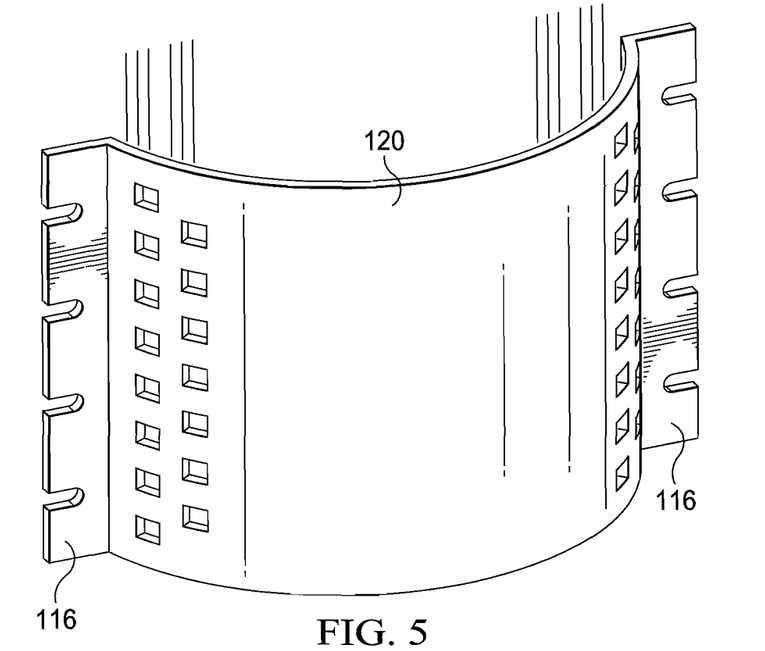
FIG. 5 is a schematic view of one patch panel assembly in which wires/cables are mounted to the rear thereof.

As illustrated in FIG. 5, wires/cables can be mounted to the rear of jack modules, which can be associated with the patch panel elements and that can be routed rearward toward the elongated bar of a wire management bracket. The wires/cables can be bent outwardly along elongated bar and, further, can be secured relative to the elongated bar by any suitable connection elements (e.g., wire ties, harnesses, fasteners, etc.). Once routed to the side (left or right), the wires/cables may be advantageously routed to any desired location. In one example embodiment, the minimum cable bend radius is maintained to four times the outside cable diameter.

Figure 6:
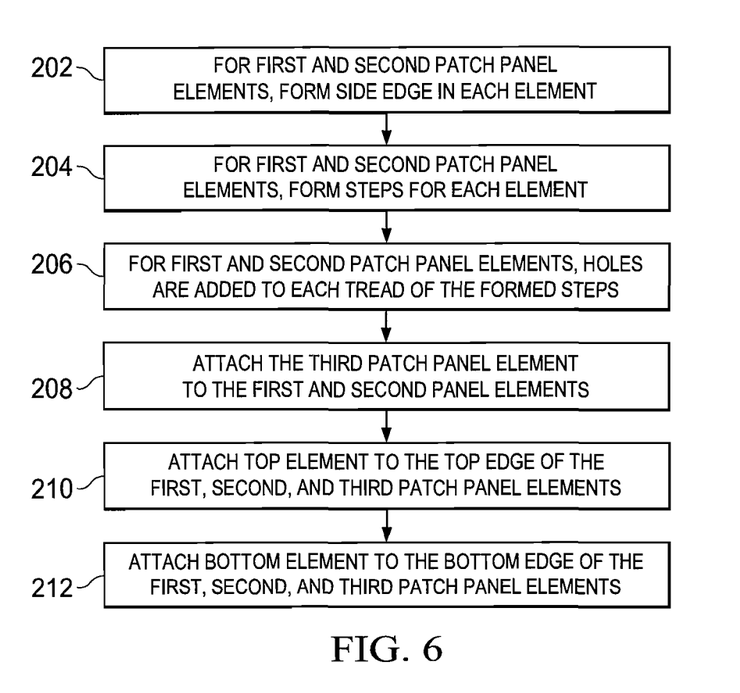
FIG. 6 is an example flowchart associated with one elongated member that includes first and second patch panel elements in accordance with one embodiment of the present disclosure.

FIG. 6 illustrates an example flowchart associated with the formation of the patch panel assembly. For the first and second panel elements, the following shaping can occur through any suitable manufacturing process. In 202, each element has a side edge formed for attaching to a communications rack (or to any other suitable object, element, apparatus, etc.). In 204, steps are formed for each of the panel elements. In 206, any number of apertures can be added to each tread, for example, of the formed steps. In 208, a third patch panel element is suitably attached in relation to the first and second panel elements. Note that the term "suitably attached" as used herein can encompass any type of attaching mechanism such as attachment through interlocking elements, through friction, fasteners, through rivets, through glue, through the manufacturing process resulting in a unitary piece being formed, etc.

The third patch panel can be suitably positioned, opposing the side edge of each of the first and second patch panel elements. In 210, a top element is suitably attached to one or more of the top edge of the first, second, and third patch panel elements. In 212, a bottom edge can be attached to one or more of the bottom edge of the first, second, and third patch panel elements.

Figure 7:
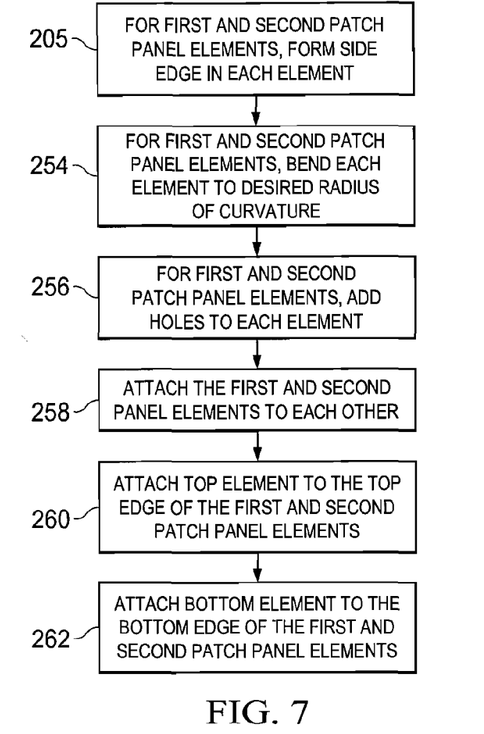
FIG. 7 is another example flowchart associated with one elongated member that includes the first and second patch panel elements in accordance with one embodiment of the present disclosure.

FIG. 7 is another flowchart illustrating an example associated with the formation of the patch panel assembly. For the first and second panel elements, the following shaping can occur through any suitable manufacturing process. In 252, each element has a side edge formed for attaching to a rack (or to any other suitable object, element, apparatus, etc.). In 254, the first and the second patch panel elements may be formed to any suitable radius of curvature. In 256, apertures are added to each the first and second patch panel elements at any appropriate location. In 258, the first and second panel elements are attached to each other at the edge their respective side edge. In 260, a top element is attached to the top edge of the first and second patch panel elements. In 262, a bottom edge is attached to the bottom edge of the first and second patch panel elements.

Figure 8:
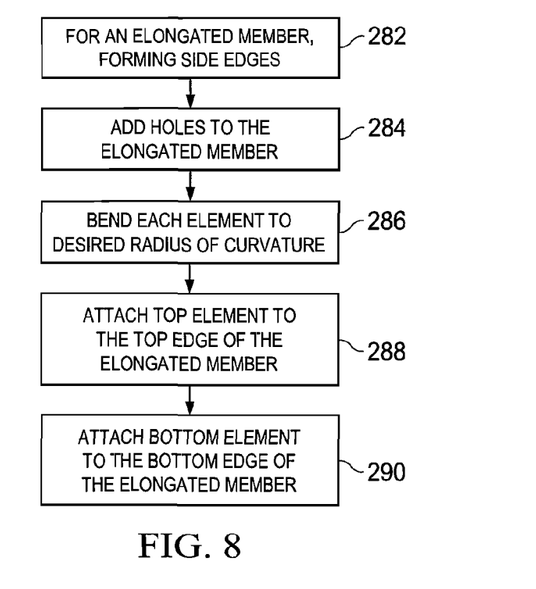
FIG. 8 is another example flowchart associated with one elongated that includes the first and second patch panel elements in accordance with one embodiment the present disclosure.

FIG. 8 is another flowchart associated with one elongated member that can comprise the first and second patch panel elements (e.g., unitary/integrated). In 282, the elongated member has side edges formed for attaching to a rack (or to any other suitable object, element, apparatus, etc.). In 284, apertures are added to the sides of the elongated member. In 286, the elongated member is formed to any suitable radius of curvature. In 288, the top element is attached to the top edge of the elongated member. In 290, a bottom edge is attached to the bottom edge of the elongated member.

In terms of the dimensions of the articles discussed herein (e.g., flanges 116, any of the panels, the apertures, etc.), any suitable specifications (e.g., length, width, depth (or height), hole space, etc.) may be used and can be based on particular design needs, or specific elements to be addressed by the apparatus (or the system or environment in which it resides). It is imperative to note that all of the specifications and relationships outlined herein (e.g., height, width, length, diameter, shape of apertures, # of apertures, etc.) have only been offered for purposes of example and teaching only. Each of these data may be varied considerably without departing from the spirit of the present disclosure, or the scope of the appended claims. The specifications apply only to one non-limiting example and, accordingly, should be construed as such. Along similar lines, the materials used in constructing the articles can be varied considerably, while remaining within the scope of the present disclosure. Various ferrous/alloy materials may be used, magnetic materials may be used, aluminums, graphites, etc. and polymers (e.g., heat resistant material, polymers, etc.) may be used in certain configurations of the present disclosure. Still other configurations may include certain integrations of these materials, which may be based on particular working needs.

In certain implementations and numerous examples provided herein, the panel is being deployed in certain console environments, rack environments, etc.; however the architecture discussed herein can be applied to a myriad of other types of configurations (e.g., any type of router architecture, switch architecture, database architecture, server architecture, computer systems more generally, etc.) and any corresponding structure (e.g., cabinets, closets, racks, proprietary elements, etc.) can be used to conjunction with the present disclosure. It is intended that the broad teachings disclosed herein are to include any such permutations, alternatives, and variations.

Moreover, certain elements described herein may be made of any suitable materials, including metal (e.g., stainless steel, copper, silver, brass, cast iron, aluminum, graphite, enamel covered cast iron, aluminum, etc.), plastic, polymers, etc. or any suitable combination thereof. Each element may also be made of a combination of different materials. Any suitable material or combination of materials may be used for the elements described herein without departing from the broad scope of the present disclosure. In addition, the shapes shown and illustrated in the various FIGURES are for example purposes only. Various other shapes may be used herein without changing the scope of the present disclosure. Along similar lines, any number of securing mechanisms can be used to integrate the elements discussed in the preceding descriptions. This could include hinges, rivets, screws, tongue and groove arrangements, simple friction, glue, etc.

Note that with the examples provided above, manufacturing may be described in terms of two, three, or four elements, parts, objects, etc. However, this has been done for purposes of clarity and example only. In certain cases, it may be easier to describe one or more of the functionalities of a given set of flows by only referencing a limited number of elements, parts, objects. It should be appreciated that the architecture of the present disclosure (and its teachings) are readily scalable and, further, can accommodate a large number of components, as well as more complicated/sophisticated arrangements and configurations. Accordingly, the examples provided should not limit the scope or inhibit the broad teachings of the system, as potentially applied to a myriad of other architectures.

It is also important to note that the steps in the preceding FIGURES illustrate only some of the possible scenarios that may be executed by, or within, the framework of the present disclosure. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by architecture of the present disclosure in that any suitable arrangements, chronologies, configurations, and timing mechanisms may be provided without departing from the teachings of the present disclosure.

Numerous other changes, substitutions, variations, alterations, and modifications may be readily ascertained and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A three-dimensional patch panel assembly to be attached to a communications rack, the three dimensional patch panel assembly comprising:
   a first panel element having a first side edge, the first side edge comprising a first mounting feature configured to be attached to the communications rack, wherein the first panel element includes a first plurality of port apertures configured to receive one or more electrical components proximate to the first side edge;
   a second panel element having a second side edge, the second side edge comprising a second mounting feature configured to be attached to the communications rack, wherein the second panel element includes a second plurality of port apertures configured to receive one or more electrical components proximate to the second side edge;
   a third panel element provided between the first panel element and the second panel element, wherein the first panel element, the second panel element, and the third panel element of the three-dimensional patch panel assembly, wherein a third panel element is at least 50% of a width of the elongated patch panel assembly, the width being measured between the first side edge and the second side edge, and wherein the third panel element does not include any apertures; and
   wherein each of the first panel element and the second panel element extends outwardly and away from a front face of the third panel element and forms a shape relative to a top surface of the panel assembly.

2. The panel assembly of claim 1, wherein the first panel element, the second panel element, and the third panel element form a single elongated element.

3. The three-dimensional patch panel assembly of claim 1, wherein the first mounting feature comprises a first flange member proximate to the first panel element and the second mounting feature comprises a second flange member proximate to the second panel element, wherein each of the first flange member and the second flange member is configured to be used in securing the three-dimensional patch panel assembly to the communications rack.

4. The three-dimensional patch panel assembly of claim 1, wherein each of the first mounting feature and the second mounting feature comprises:
   at least one flange member that is to define a mounting face for mounting the three-dimensional patch panel assembly to the communications rack.

5. The three-dimensional patch panel assembly of claim 1, wherein the three-dimensional patch panel assembly includes a perimeter that is reinforced and that is integral to at least one selected from the group of the first panel element, the second panel element, and the third panel element.

6. The three-dimensional patch panel assembly of claim 1, further comprising:
   a top panel; and
   a bottom panel, wherein the top panel and the bottom panel define a region that is to provide an air dam to increase airflow to at least one instrument mounted in the communications rack.

7. The three-dimensional patch panel assembly of claim 1, wherein each of the first plurality of port apertures is located within four inches of the first side edge and each of the second plurality of port apertures is located within four inches of the second side edge.

8. The three-dimensional patch panel assembly of claim 1, wherein the shape formed relative to the top surface of the three-dimensional patch panel assembly by each of the first panel element and second panel element comprises a curvature relative to the top surface of the three-dimensional patch panel assembly.

9. A method for forming a three-dimensional patch panel assembly to be attached to a communications rack, the method comprising:
   forming a first panel element having a first side edge, the first side edge comprising a first mounting feature configured to be attached to the communications rack, wherein the first panel element includes a first plurality of port apertures configured to receive one or more electrical components proximate to the first side edge;
   forming a second panel element having a second side edge, the second side edge comprising a second mounting feature configured to be attached to the communications rack, wherein the second panel element includes a second plurality of port apertures configured to receive one or more electrical components proximate to the second side edge;
   forming a third panel element provided between the first panel element and the second panel element, wherein the first panel element, the second panel element, and the third panel element of the three-dimensional patch panel assembly form an elongated patch panel assembly, wherein a third panel element is at least 50% of a width of the elongated patch panel assembly, the width being measured between the first side edge and the second side edge, and wherein the third panel element does not include any apertures; and
   wherein each of the first panel element and the second panel element extends outwardly and away from a front face of the third panel element and forms a shape relative to a top surface of the panel assembly.

10. The method of claim 9, wherein the first panel element, the second panel element, and the third panel element form a single elongated element.

11. The method of claim 9,
   wherein the first mounting feature comprises a first flange member proximate to the first panel element and the second mounting feature comprises a second flange member proximate to the second panel element, wherein each of the first flange member and the second flange member is configured to be used in securing the three-dimensional patch panel assembly to the communications rack.

12. The method of claim 9, wherein each of the first mounting feature and the second mounting feature comprises:
   forming at least one flange member that is to define a mounting face for mounting the three-dimensional patch panel assembly to the communications rack.

13. The method of claim 9, further comprising:
   forming a reinforcing element at a perimeter of the three-dimensional patch panel assembly, wherein the reinforcing element is integral to at least one selected from the group of the first panel element, the second panel element, and the third panel element.

14. The method of claim 9, further comprising:
   forming a top panel; and
   forming a bottom panel, wherein the top panel and the bottom panel define a region that is to provide an air dam to increase airflow to at least one instrument mounted in the communications rack.

15. The method of claim 9, wherein each of the first plurality of port apertures is located within four inches of the first side edge and each of the second plurality of port apertures is located within four inches of the second side edge.

16. The method of claim 9, wherein the shape formed relative to the top surface of the three-dimensional patch panel assembly by each of the first panel element and second panel element comprises a curvature relative to the top surface of the three-dimensional patch panel assembly.

* * * * *